United States Patent

[11] 3,586,188

[72] Inventor William Edison Cambell
 1084 Rickenbacker St., San Jose, Calif. 95128
[21] Appl. No. 878,292
[22] Filed Nov. 20, 1969
[45] Patented June 22, 1971

[54] MOTORCYCLE MOUNT FOR VEHICLES
 5 Claims, 4 Drawing Figs.
[52] U.S. Cl. .................................................. 214/450
[51] Int. Cl. .................................................. B60r 9/00
[50] Field of Search .......................................... 214/450

[56] References Cited
 UNITED STATES PATENTS
 3,366,256 1/1968 Meredith et al. ............ 214/450
 3,458,073 7/1969 Dawson ...................... 214/450

Primary Examiner—Gerald M. Forlenza
Assistant Examiner—John Mannix
Attorney—Arlington C. White ABSTRACT: The disclosure relates to a carrier for two-wheeled mobile equipment such as motorcycles, scooters, bicycles and the like, which may be removably and pivotally mounted on a bumper of such four wheeled vehicles as campers, trailers, and similar motor vehicles. The carrier includes a channeled supporting element equipped with a self-contained extendable and retractable ramp for unloading and loading a two-wheeled equipment from and onto the supporting element, as well as equipped with a self-contained fold-up kick stand for supporting both the carrier and supported equipment, and also equipped with latching means for supporting the carrier and load on the bumper of a vehicle and in spaced relation thereto.

PATENTED JUN 22 1971 3,586,188

INVENTOR
WILLIAM EDISON CAMPBELL
BY *Arlington C. White*
ATTORNEY

INVENTOR
WILLIAM EDISON CAMPBELL
BY *Arlington C. White*
ATTORNEY

3,586,188

MOTORCYCLE MOUNT FOR VEHICLES

The invention relates generally to the carrier art and more particularly relates to a pivotably and removably mounted motorcycle carrier which permits of ready loading and unloading thereof onto and from an end of the bumper at the rear of a motor vehicle.

A primary object of the present invention is to provide a motorcycle mount for vehicles which is relatively light in weight for convenience of attaching and detaching from operative position yet sufficiently rugged as to effectively support a motorcycle rigidly thereon over both smooth and rough terrain without dislodgment.

Another important object of my invention is to provide a motorcycle mount of the indicated nature which is additionally characterized by the facility of loading and unloading a motorcycle therefrom.

A still further object of my present invention is to provide a motorcycle mount for vehicles of the aforementioned character which affords complete access to rear doors on the vehicle as well as complete closing and opening of such doors without interference.

Other objects of the invention, together with some of the advantageous features thereof, will appear from the following description of a preferred embodiment of the invention which is illustrated in the accompanying drawings.

Referring to the drawings.

Figure 1:
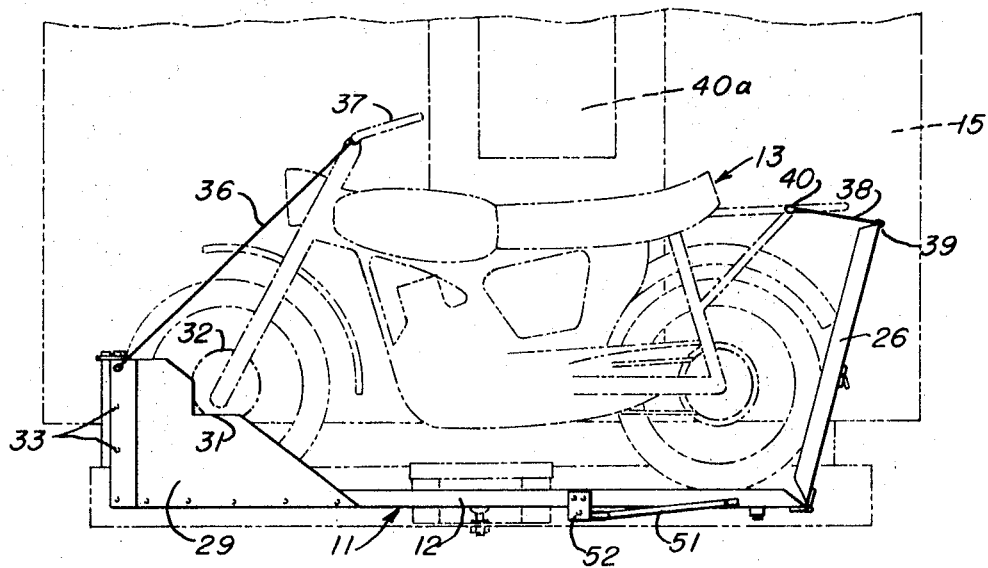
FIG. 1 is a front elevational view of a preferred embodiment of the invention in mounted position on the rear of a camper which is shown in fragmentary elevation.

In accordance with the present invention, I provide as a preferred embodiment of my improved mount a carrier, which is designated generally by the reference numeral 11 and which is preferably fabricated from a suitable lightweight metal, such as aluminum. The carrier 11 includes a relatively long channel section 12 onto which any type of a two-wheeled vehicle, such as a motorcycle 13, may be removable supported and carried upon the rear bumper 14 of a four-wheeled motor vehicle 15, such as a camper or trailer. The carrier 11 is pivotally and removably attached to one end of bumper 14 at the side of the camper 15 by means of three rods 16, 17 and 18 which are each threaded exteriorly at their lower ends for threadedly engaging into interiorly threaded holes, not shown, formed in bumper 14, as well as by means of a hollow tube 19 which removably fits over the rod 16 and which is carried by carrier extensions 21 and 22. The extensions 21 and 22 are riveted or otherwise permanently secured to the inner end of channel section 12 of carrier 11 at opposite sides thereof; such extensions being welded or otherwise fastened at diametrically opposite points to the tube 19 to hold the same in an upright position, all as clearly illustrated in the exploded view of FIG. 4 of the annexed drawings. The three upright rods 16, 17 and 18 are rigidly maintained in such positions by a template 23 which is suitably apertured to pass the upper portions of the three rods and which may be fastened thereto by a suitably sized cotter key 24. This arrangement of the above described components affords the removable as well as pivotal mounting of the carrier, with or without a load, onto the rear bumper 14 of any mobile unit.

Figure 2:
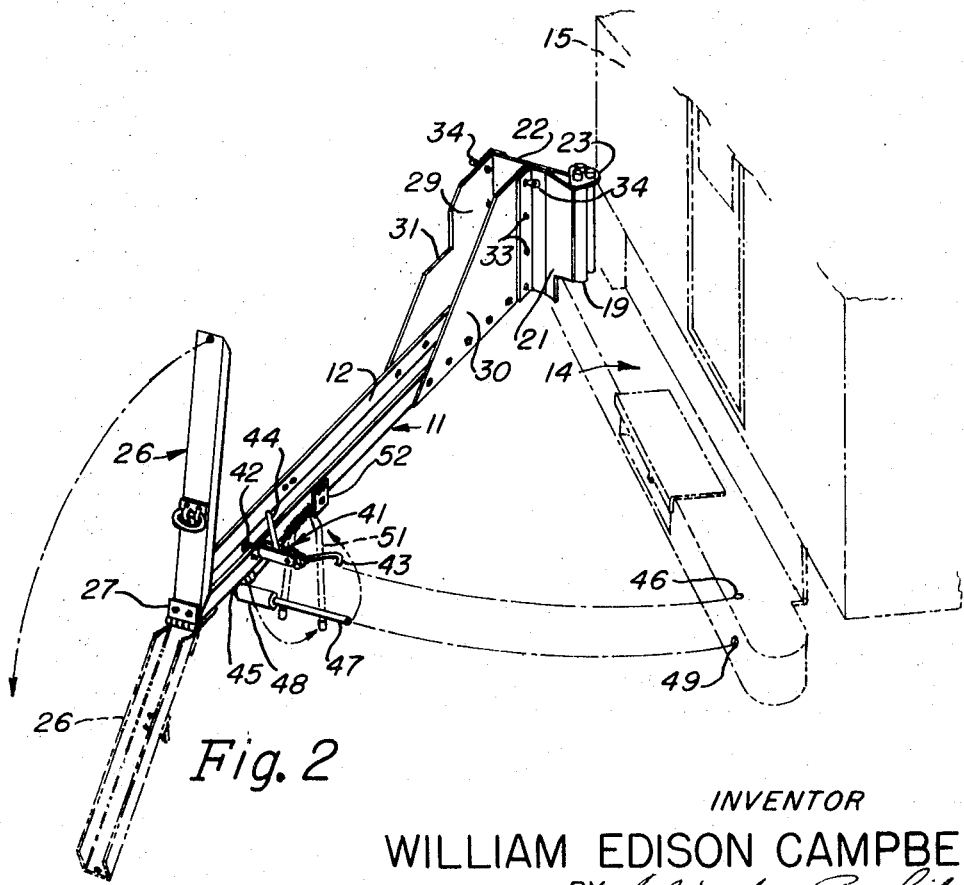
FIG. 2 is a end perspective view of the preferred embodiment of the invention in swung away position from the rear of a camper and unloaded, the camper being shown in fragmentary elevation, and the ramp illustrated in both extended and retracted positions.
Figure 3:
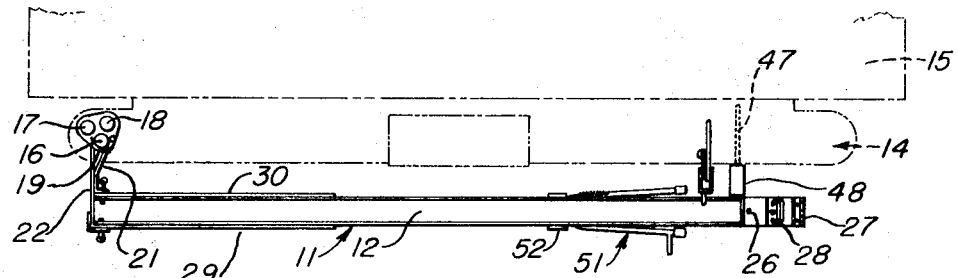
FIG. 3 is a plan view of the preferred embodiment of my invention in unloaded condition and disposed in latched relation to the rear bumper of a vehicle.
Figure 4:
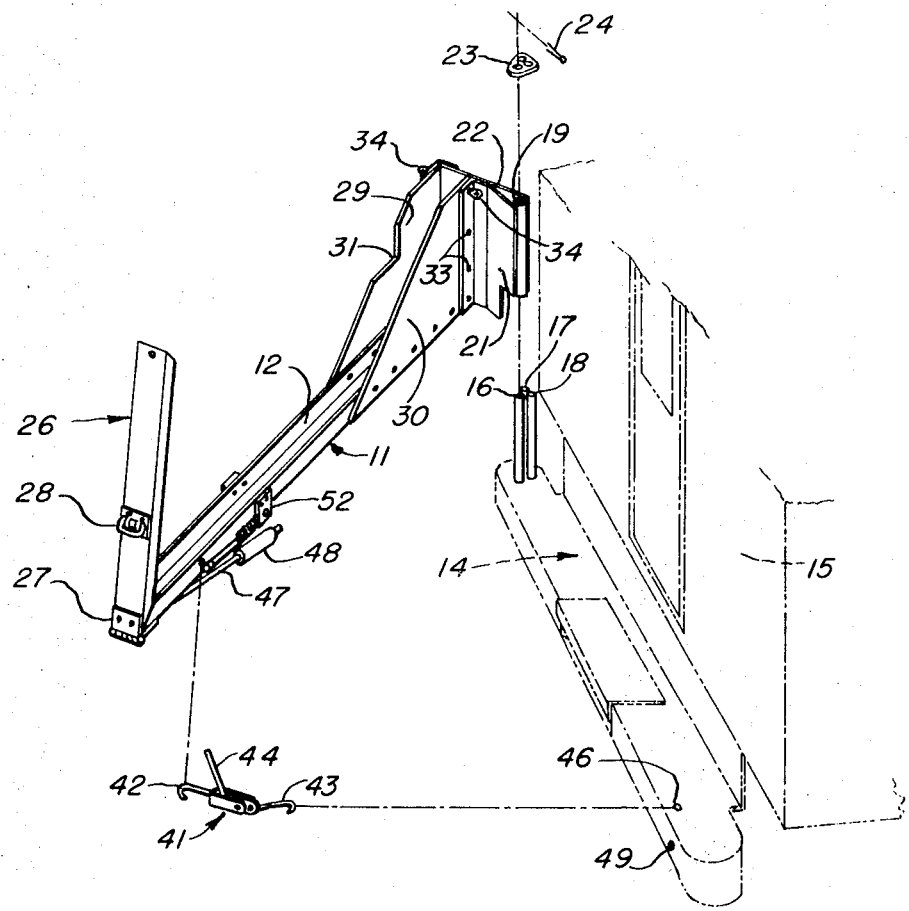
FIG. 4 is an exploded end perspective view of the preferred embodiment of the invention; this view illustrating the ready attachment and removal of the mount, in unloaded state, to and from the bumper of a camper, trailer or like vehicle.

As particularly illustrated in FIGS. 2 and 4, I affix a ramp channel section 26 onto the relatively long channel section 12 of the carrier by means of suitable hinge 27 so that upon lowering the ramp 26 to the ground, a two-wheeled vehicle, such as motorcycle 13 can be moved up the ramp onto the channel section 12 and brought to rest. The ramp channel section 26 can then be raised and moved to a rest position against the rear of the motorcycle. A handle 28 is hingedly connected to the underside of the ramp channel section to aid in grasping and lowering the same to the ground as well as swinging the carrier toward and away from bumper 14. The front wheel of the motorcycle, upon loading the same onto the relatively long channel section 12 of carrier 11 enters between a pair of side plates 29 and 30 which are riveted or otherwise rigidly secured to opposite sides of the channel section 12, as shown. A notch 31 is cut into one of the side plates, say the plate 29, for receiving the brake drum 32 of the motorcycle when brought to rest. Each of the side plates is formed with a series of holes 33 for receiving an eyebolt 34 in any selected one of the holes. A suitable strap 36 is fed through an eye of a bolt 34 and wrapped about the handlebar 37 of motorcycle 13 to secure it in loaded position on the carrier. A similar strap 38 is fed through a hole 39 in the ramp section 26 of carrier 11 to hold such ramp section in inoperative position with an end of strap 38 wrapped around a portion 40 of motorcycle 13.

In accordance with the present invention, I provide means for swinging the carrier 11 to a position slightly behind the bumper 14 of camper 15 so as to latch the loaded carrier to the camper yet without engaging and marring the bumper and permitting access into and out of the camper 15 through its rear door 40a which is not barred by the loaded carrier. These latching means include spring-loaded tension binder 41 which is provided with hooks 42 and 43 extending from opposite ends thereof, together with a lever 44 for holding the hooks 42 and 43 in predetermined extended positions when folded down to tension the spring of the binder, and permitting, when the lever is raised to release the tension of such spring, easy unhooking of hook 43 and thereby permit pivoting of the carrier 11 away from the bumper when it is desired to unload the carrier motorcycle. Rearwardly extending hook 42 is placed in a hole 45 formed in the side of channel section 12 of the carrier 11 while forwardly extending hook 43 of the tension binder 41 is placed in a hole 46 formed in the upper surface of bumper 14 of the camper when the carrier 11 is positioned in close proximity thereto and thus latched to the bumper. I also provide a short support rod 47 on which a collar 48 is slidably mounted for holding the carrier 11 at a given distance from bumper 14; the rod 47 entering a hole 49 provided in the apron of the bumper 14. Both the rod 47 and collar 48 are pivotally mounted on the underside of channel section 12 and may be swung to a position under such channel section when not in use.

As shown in FIG. 2 by dotted line showing, I provide a two-legged spring-loaded kickstand 51 for supporting carrier 11 in position for both loading and unloading the carrier with a two-wheeled vehicle. Kickstand 51 is conveniently pivotally mounted on a bracket 52 secured to the side of channel section 12 of the carrier and may be folded under such section when not in use.

The foregoing combination of elements affords equipment for carrying such two-wheeled vehicles as motorcycles on the back of campers, trailers or the like while permitting access to the entrance to the camper with the motorcycle mounted and secured on the carrier, if desired. The arrangement of the lightweight metal parts provides for quick and easy mounting of the motorcycle on the carrier with the same speed and ease in dismounting the same. The position of the latching means on the carrier not only provides for easy locking of the mount to the bumper of the camper but also provides for proper distribution of weight to both ends of the bumper. The provision of a swingable kickstand enables the loaded carrier to be effectively supported.

I claim:

1. A motorcycle mount for vehicles comprising, in combination with the rear bumper of a camper, a carrier, a long channel section on said carrier for receiving and holding a motorcycle, a pair of extensions projecting from opposite sides and at one end of said long channel section, three rods secured in upright positions on one end of said bumper adjacent to a side of said camper; a first rod of said three rods acting as a pivotal support for said carrier, a second rod of said three rods acting as a stop to prevent swinging of said carrier beyond the adjacent side of said campers, and a third rod of said rods acting as a support for the other two, a template spanning and removably secured on the upper portions of said three rods to lend rigidity thereto, a tubular member welded at diametrically opposite points thereof to each of said pair of extensions and slidably mounted on said first rod for removably as well as pivotally supporting said carrier on said first rod, means for lashing said motorcycle to said carrier, and means for removably latching said carrier to and in spaced relation from said bumper.

2. A motorcycle mount for vehicles as defined in claim 1, and an extendable and retractable kickstand pivotally mounted on said long channel section for supporting said carrier both in loaded and unloaded state.

3. A motorcycle mount for vehicles as defined in claim 1, and a ramp channel section pivotally attached to said long channel section and serving as an extension thereof to facilitate movement of a motorcycle onto said carrier when said ramp channel section is lowered to the ground.

4. A motorcycle mount for vehicles as defined in claim 1, wherein said lashing means consists of a pair of side plates riveted to opposite sides of said long channel section; said plates each having a series of holes therein arranged one above the other, an eyebolt removably placed in any one of said holes, and straps looped through the eye of said eyebolt and wrapped around the handlebar of the motorcycle.

5. A motorcycle mount for vehicles as defined in claim 1, wherein said means for latching said carrier to said bumper consists of a spring-loaded tension binder having a rearwardly extending hook affixed to said carrier, a forwardly extending hook removably fastened to said bumper, and a lever for tensioning the spring of said binder to hold said carrier in a fixed spaced relationship to said bumper and for releasing the tension of the spring of said binder to permit the release of said forwardly extending hook and the swinging of said carrier away from said bumper.